UNITED STATES PATENT OFFICE 3,304,334
TRIS-(2-HYDROXYPERHALOFLUORO-2-PROPYL) BENZENES AND PROCESS FOR PREPARING THEM
Edward S. Jones, Whippany, N.J., assignor to Allied Chemical Corporation, New York, N.Y., a corporation of New York
No Drawing. Filed Sept. 18, 1964, Ser. No. 397,625
7 Claims. (Cl. 260—618)

This invention relates to the new compounds tris-1,3,5-(2-hydroxyhexafluoro-2-propyl) benzene and tris-1,3,5-(2-hydroxypentafluoromonochloro-2-propyl) benzene and to a process for preparing them.

It is known to react fluorinated ketones with aromatic compounds under Friedel-Crafts conditions to produce mono- and dihydroxy tertiary alcohols. Efforts to introduce three hydroxyhexahaloisopropyl groups into the aryl nucleus have been unsuccessful. Thus when equimolecular amount of reactants, or an excess of aromatic compound is employed, the product obtained is the mono alcohol. When two moles or more of ketone per mole of aromatic compound are employed, the resulting product is the diol.

I have now found that tris-1,3,5-(2-hydroxyperhalofluoro-2-propyl) benzenes wherein not more than one of the halogenes is chlorine, the remainder being fluorine, can be prepared either directly from benzene and the perhalofluoroacetone, or from mono- or bis-(2-hydroxyperhalofluoro-2-propyl) benzenes and the perhalofluoroacetone, by reacting at least about the stoichiometric amount of fluoroacetone theoretically required to produce the tri-substituted benzene; namely, three, two or one mole respectively of perhalofluoroacetone, with the benzene or substituted benzene, at temperatures between about 150° C. and about 300° C., under pressures of at least about 20 kilobars and in the presence of small amounts of boron trifluoride as catalyst.

The new compounds of my invention have the formula shown below:

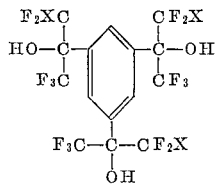

wherein X is fluorine or chlorine.

The reactions according to my invention proceed as follows:

(I)

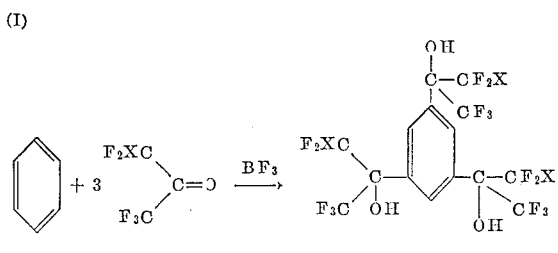

(II)

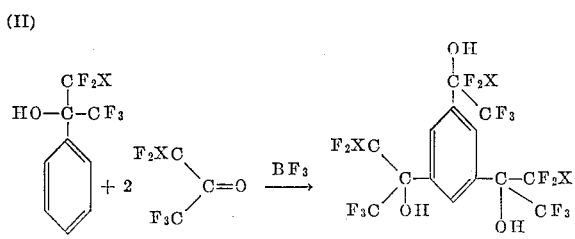

(III)

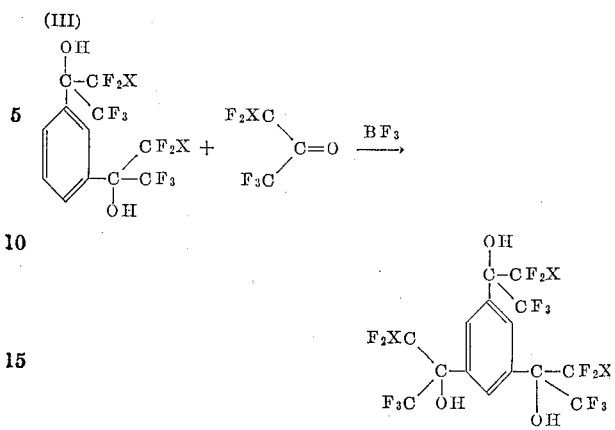

In carrying out the process according to the invention, the reactants, together with the catalyst, are placed into a capsule, suitably of nickel, so as to completely fill the capsule. The filled capsule is closed as by soldering, and is placed in a furnace such as a steel tube-pyropholite furnace assembly, and this assembly in turn is inserted into a high pressure device such as a piston cylinder device of the type described by Boyd and England in J. Geophysical Research, vol. 65, No. 2 (February 1960), pages 741–748. Pressure is applied, then the reactants are heated to the required temperature and maintained under pressure and temperature conditions until reaction has taken place, usually a period between about ½ hour and about 3 hours being sufficient for completion of the reaction. The reactor is allowed to cool, pressure is released and the capsule removed.

The pressure used in the reaction is critical and must be at least about 20 kilobars to bring about introduction of the third 2-hydroxyperhalofluoro-2-propyl group into the benzene ring. Pressures in excess of about 20 kb., for example, 20 kb. to 30 kb. or higher, may be used, but are not necessary.

Presence of boron trifluoride catalyst is also critical. This compound should be present in at least catalytic amounts, although larger amounts do no harm. Proportions of between about 0.02% and about 0.2% by weight based on the weight of the benzene compound are satisfactory.

Suitable temperatures will vary somewhat, depending on the haloacetone starting material; the pentafluoromonochloroacetone reacting readily in the lower temperature ranges, preferably between about 150° C. and about 225° C., the hexafluoroacetone reacting readily in the higher temperature ranges, for example, between about 200° C. and about 300° C., preferably between about 225° C. and about 250° C.

The resulting tris-1,3,5-(2-hydroxyperhalofluoro-2-propyl) benzenes are white solids. The infrared spectrogram of the new tris-1,3,5-(2-hydroxyhexafluoro-2-propyl) benzene shows major characteristic absorption bands at 2.7 microns, 6.25 microns, 6.9 microns; and minor bands at 8–9 microns, 10.2 microns, 11.18 microns, 12.86 microns, 13.7 microns, and 14.13 microns. Its proton nuclear magnetic resonance spectrum has two peaks of equal intensity at 3.26 p.p.m. and 8.00 p.p.m. indicative of the 1,3,5-triol structure.

The new tris-1,3,5-(2-hydroxyperhalofluoro-2-propyl) benzenes of my invention are useful as reactants in the preparation of polyethers, polyesters, polyamides, and polyurethanes, useful as plastics, fibers, coatings, elastomers, and foams. Because of their trifunctionality, they are especially useful as cross-linking agents, used in small amounts in the preparation of such polymers. When used as the sole reactant with 2,4-toluene diisocyanate, they produce polymers of high electrical resistivity and good dielectric properties useful in electrical insulation applications.

The following specific examples further illustrate the invention. Parts are by weight except as otherwise noted.

*Example 1*

A 4.25 gram sample (.0145 mole) of bis-1,3-(2-hydroxyhexafluoro-2-propyl) benzene was placed into a 4 cc. nickel capsule, the capsule was attached to a vacuum line and a 2.4 gram (.022 mole) sample of hexafluoroacetone containing 0.1 gram of $BF_3$ was condensed into the capsule using liquid nitrogen as the condensing agent. While still in the liquid nitrogen, the capsule was closed by crimping its neck, cutting it from the vacuum line and silver soldering it closed. The filled capsule was placed into a steel tube-pyrophilite furnace assembly and this in turn was inserted into a piston cylinder pressure device. A pressure of 20 kilobars (kb.) was applied to the sample which was heated electrically to 225° C. Pressure and temperature were continued for three hours. The reactor was then allowed to cool, pressure was released and the capsule removed. The oily reaction product was extracted from the capsule with ether. After evaporation of the ether the product solidified. Sublimation on a steam bath yielded 5.22 grams of white solid, tris-1,3,5-(2-hydroxyhexafluoro-2-propyl) benzene, M.P. 75–90° C. yield 91%. The product was found to be hygroscopic, and drying over $P_2O_5$ under vacuum raised the M.P. to 102–104° C. A resublimed sample had M.P. 105–106° C.

*Analysis.*—Calculated: C, 31.27; H, 1.05; F, 59.35. Found: C, 31.21; H, 0.89; F, 58.93.

*Example 2*

In a test carried out in a manner identical to that described in Example 1 above except that no boron trifluoride was included in the capsule, no reaction took place. A gaseous product was recovered which had an infrared spectrum identical to the starting hexafluoroacetone and the liquid residue was identified as the starting diol. This example indicates that pressure alone is not enough to bring about reaction to the triol, and that $BF_3$ catalyst is essential.

*Example 3*

A 4.35 gram (0.015 mole) sample of bis-1,3-(2-hydroxyhexafluoro-2-propyl) benzene, 2.0 grams (0.018 mole) of hexafluoroacetone and about 0.1 gram of $BF_3$ were pressurized to 8 kb. and heated to 250° C. for 3 hours in the apparatus described in Example 1 above. Examination of the resulting gaseous and liquid products proved them to be identical with the starting material indicating that even in the presence of $BF_3$ catalyst, pressures in excess of 8 kb. are necessary to bring about reaction to the triol.

The above test was repeated using 15 kb. pressure and similarly no triol was formed.

*Example 4*

A mixture of 0.79 gram (.010 mole) of benzene, 5.3 grams (.048 mole) of hexafluoroacetone and about 0.1 gram of $BF_3$ was encapsulated and pressurized as described in Example 1, to 20 kilobars pressure and heated to 225° C. for three hours. Upon opening the capsule, a small amount of hexafluoroacetone was recovered plus 3.5 grams of a mixed liquid and solid. Sublimation of the product, followed by drying over $P_2O_5$, yielded 2.4 grams of solid tris-1,3,5-(2-hydroxyhexafluoro-2-propyl) benzene, M.P. 103–104° C. identical to the product formed in Example 1.

*Example 5*

When Example 4 was repeated using pentafluoromonochloroacetone in place of hexafluoroacetone, pressured to 20 kilobars and heated to 175° C., a 30% yield of tris-1,3,5-(2-hydroxypentafluoromonochloro-2-propyl) benzene was obtained.

*Example 6*

A mixture of 2.19 grams (0.0084 mole) of mono-(2-hydroxypentafluoromonochloro-2-propyl) benzene, 4.0 grams (.022 mole) of pentafluoromonochloroacetone and .1 gram of $BF_3$ were pressured to 20 kb. and heated to 200° C. for five hours in the apparatus described in Example 1. Upon opening the capsule, tris-1,3,5-(2-hydroxypentafluoromonochloro-2-propyl) benzene was recovered in about 20% yield.

*Example 7*

A mixture of 0.85 gram (.011 mole) benzene and 4.98 grams (.045 mole) of hexafluoroacetone were pressured as in Example 1 to 20 kilobars and heated to 225° C. for three hours. Upon opening the capsule, two mole equivalents of hexafluoroacetone were recovered plus 1.6 grams (60% yield) of hydroxyhexafluoro-2-propyl benzene B.P. 157–162° C. and having an infrared spectrogram corresponding to an authentic sample of the above mono alcohol.

This example demonstrates that pressure alone, in the absence of $BF_3$ catalyst does not bring about reaction of three moles of hexafluoroacetone to form the triol, and that only the mono alcohol is formed.

*Example 8*

To a sample of 1.15 parts of tris-1,3,5-(2-hydroxyhexafluoro-2-propyl) benzene and 0.61 part of triethyl amine in 8.8 parts of benzene was added 0.52 part of toluene diisocyanate in 8.8 parts of benzene. The mixture was stirred and refluxed for six hours, then cooled to about 25° C. Then 50 parts of water were added, producing an emulsion which on filtering, yielded 1.16 grams of a light yellow solid polymer. A wafer of the polymer was prepared by pressing in a squeezer apparatus at room temperature. Tests showed it to be thermally stable to 290° C., and its electrical resistance to be <20 megohms which indicates a resistivity greater than $10^8$ ohm-cmm., demonstrating the good dielectric properties of the polymer.

While the above describes the preferred embodiments of the invention, it will be understood that departures can be made therefrom within the scope of the specification and claims.

I claim:
1. Tris-1,3,5-(2-hydroxyperhalofluoro-2-propyl) benzenes of the formula

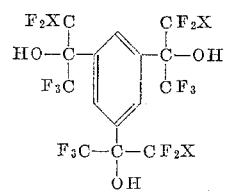

wherein X is a member selected from the group consisting of chlorine and fluorine.

2. Tris-1,3,5-(2-hydroxyhexafluoro-2-propyl) benzene.
3. Tris - 1,3,5 - (2 - hydroxypentafluoromonochloro-2-propyl) benzene.
4. The process for preparing a tris-1,3,5-(2-hydroxyperhalofluoro-2-propyl) benzene of the formula

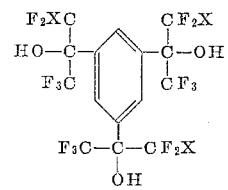

wherein X is a member selected from the group consisting of chlorine and fluorine, which comprises subjecting a mixture of (1) a perhalofluoroacetone selected from the group consisting of hexafluoroacetone and pentafluoromonochloroacetone, and (2) a benzene compound selected from the group consisting of zenzene, mono-(2-hydroxyhexafluoro - 2 - propyl) benzene; bis - (2 - hydroxyhexafluoro - 2 - propyl) benzene; mono - (2 - hydroxypentafluoromonochloro - 2 - propyl) benzene; and bis - (2 - hydroxypentafluoromonochloro - 2 - propyl) benzene, in proportions of at least the stoichiometric amount of perhalofluoroacetone and benzene compound theoretically necessary to produce the tris-(2-hydroxyperhalofluoro-2-propyl) benzene, to a pressure of at least about 20 kilobars and a temperature between about 150° C. and about 300° C. in the presence of boron trifluoride as catalyst.

5. The process for preparing tris-1,3,5-(2-hydroxyhexafluoro-2-propyl) benzene which comprises subjecting a mixture of hexafluoroacetone and a benzene compound selected from the group consisting of benzene, mono-(2-hydroxyhexafluoro-2-propyl) benzene and bis-(2-hydroxyhexafluoro-2-propyl) benzene, in the proportions of at least the stoichiometric amount of hexafluoroacetone and benzene compound theoretically necessary to produce the tris-(2-hydroxyhexafluoro-2-propyl) benzene, to a pressure of at least about 20 kilobars and a temperature between about 200° C. and about 300° C. in the presence of boron trifluoride as catalyst.

6. The process for preparing tris-1,3,5-(2-hydroxyhexafluoro-2-propyl) benzene which comprises subjecting a mixture of hexafluoroacetone and bis-(2-hydroxyhexafluoro-2-propyl) benzene, in the proportions of at least about one mole of hexafluoroacetone per mole of bis-(2-hydroxyhexafluoro-2-propyl) benzene, to a pressure of at least about 20 kilobars and a temperature between about 200° C. and about 300° C. in the presence of boron trifluoride as catalyst.

7. The process for preparing tris-1,3,5-(2-hydroxyhexafluoro-2-propyl) benzene which comprises subjecting a mixture of hexafluoroacetone and benzene, in proportions of at least about three moles of hexafluoroacetone per mole of benzene to a pressure of at least about 20 kilobars and a temperature between about 200° C. and about 300° C. in the presence of boron trifluoride as catalyst.

References Cited by the Examiner

Knunyants et al.: "Chem. Abstracts," vol. 54, pp. 20962–3 (1960).

LEON ZITVER, *Primary Examiner.*

T. G. DILLAHUNTY, *Assistant Examiner.*